United States Patent [19]

Chatterjee et al.

[11] Patent Number: 4,576,983

[45] Date of Patent: Mar. 18, 1986

[54] POLYMERIC COMPOSITION USEFUL FOR HOT WATER PIPE SERVICE

[75] Inventors: Ananda M. Chatterjee, Houston; Earl E. Hayden, Katy, both of Tex.

[73] Assignee: Shell Oil Company, Houston, Tex.

[21] Appl. No.: 716,524

[22] Filed: Mar. 27, 1985

Related U.S. Application Data

[63] Continuation of Ser. No. 646,483, Aug. 31, 1984, abandoned, which is a continuation of Ser. No. 531,527, Sep. 12, 1983, abandoned.

[51] Int. Cl.[4] .................................................. C08K 5/36
[52] U.S. Cl. ................................. 524/101; 524/304; 524/399
[58] Field of Search .............. 524/101, 291, 232, 399; 523/310

[56]  References Cited

U.S. PATENT DOCUMENTS

| 2,991,264 | 7/1961 | Monroe et al. | 524/232 |
|---|---|---|---|
| 3,207,735 | 9/1965 | Wijga | 524/291 |
| 3,207,736 | 9/1965 | Wijga | 524/295 |
| 3,207,738 | 9/1965 | Wijga | 524/291 |
| 3,285,855 | 11/1965 | Dexter et al. | 524/291 |
| 3,644,482 | 2/1972 | Dexter et al. | 524/291 |
| 4,049,654 | 9/1977 | Spivack | 524/101 |
| 4,098,762 | 7/1978 | Mujata et al. | 524/210 |
| 4,255,303 | 3/1981 | Keogh | 524/399 |
| 4,322,503 | 3/1982 | Chatterjee | 524/232 |
| 4,532,165 | 7/1985 | Hashimoto et al. | 524/291 |

OTHER PUBLICATIONS

F. Mitterhofer "Processing Stability of Polyolefins" Polymer Eng. & Sci. (mid. Jul. 1980) vol. 20, No. 10, 692–695.

I. D. Rubin–Poly(1–Butene)–Its Preparation and Properties, 87–98 (1968).

Primary Examiner—Veronica P. Hoke
Attorney, Agent, or Firm—Jennifer R. Daunis

[57] ABSTRACT

District heating pipes for potable water contain a polymer composition which comprises a butene-1 homopolymer, sterically hindered phenolic antioxidant, laurylstearyl thiodipropionate, nucleating agent, mineral filler coated with acid acceptor and pigment.

6 Claims, No Drawings

POLYMERIC COMPOSITION USEFUL FOR HOT WATER PIPE SERVICE

This is a continuation of application Ser. No. 646,483, filed Aug. 31, 1984, which is a continuation of application Ser. No. 531,527, filed Sept. 12, 1983.

BACKGROUND OF THE INVENTION

1. Field of the Invention

The present invention relates to district heating pipes for potable water which contain a polymeric composition which has particular utility for hot water pipe service. In particular, the present invention relates to a polymeric composition comprising a butene-1 homopolymer and a particular group of additive components.

2. Description of the Prior Art

Since its introduction in the United States in the early 1970's, the major market for butene-1 polymers has been in hot water extruded pipe applications. For the most part, these prior art butene-1 polymer compositions comprised a butene-1 polymer along with various standard antioxidants. In these plumbing applications, the flexibility of the butene-1 polymers, its good creep resistance over a wide range of temperatures and high hydrostatic design stress rating were very useful properties. However, one drawback of the prior art polybutylene plumbing resins is the deactivation of stabilizer due to hot water aging, leading to partial loss of stability. Especially for more demanding applications such as district heating where the pipes are continuously exposed to hot water, improvements were required in the prior art plumbing grade resins. The present invention deals with a combination of ingredients in a butene-1 polymer composition that is a significant improvement in the art.

SUMMARY OF THE INVENTION

The present invention relates to district heating pipes for potable water which contain a butene-1 homopolymer composition having particular utility in hot water pipe service. In particular, the present invention comprises a polymeric composition consisting essentially of an intimate blend of:

(a) about 93 to about 98 percent by weight of an isotactic butene-1 homopolymer;
(b) about 0.05 to about 0.5 percent by weight of 1,3,5-Tris(4-tert-butyl-3-hydroxy-2,6-dimethyl-benzyl)-1,3,5-triazine-2,4,6-(1H,3H,5H)-trione antioxidant;
(c) about 0.2 to about 0.7 percent by weight of lauryl-stearyl thiodipropionate;
(d) about 0.02 to about 0.6 percent by weight of a nucleating agent;
(e) about 0.5 to about 3.0 percent by weight of filler component comprising a mineral filler coated with an acid acceptor; and
(f) zero to about 3.0 pecent by weight pigment.

While each of the ingredients (a) through (e) are significant in achieving the overall balance of excellent properties, it is important to note that the invention is directed to a combination of ingredients. This combination of ingredients could not have been synthesized by just picking and choosing, for example, the best antioxidant and the best nucleant, etc. A significant aspect of the present invention is how the various ingredients work together, therein resulting in a superior product. The butene-1 homopolymer, of course, is important in providing good creep resistance over a wide range of temperatures and high hydrostatic design stress rating which is based on high hoop stress. The sterically hindered phenolic antioxidant provides oxidative stability. The lauryl-stearyl thiodipropionate is a costabilizer and acts as a hydroperoxide decomposer. It has been found here that in combination with the particular antioxidant claimed, a significant effect on long term stability is obtained. The nucleating agent results in faster pipe extrusion speed and an overall improvement in pipe properties. Further, the presence of a high density polyethylene nucleant in the formulation results in higher elongation and break strength in the machine direction.

The resulting overall polymeric composition has an excellent, superior balance of properties not available in prior art formulations. Of most significance, the formulations of the present invention possess an estimated long term stability in hot water (95° C.) service which is considerably improved over that for prior art formulations.

DETAILED DESCRIPTION OF THE INVENTION

The butene-1 homopolymer employed herein is an isotactic butene-1 homopolymer. The polymers used herein are suitably crystallizable thermoplastic butene-1 polymers with number average molecular weights above 15,000, preferably above 20,000 and an isotactic content above 85%, preferably above 90%, and more preferably above 95%, determined as the diethyl ether-insoluble component. Suitable isotactic butene-1 polymers are commercially available and methods for their preparation are well known in the art, as shown in, for example, U.S. Pat. No. 3,362,940. Illustrative of butene-1 polymers suitable for use in the present invention (if the above requirements are met) are those known in the industry as pipe grades. Especially preferred are Shell butene-1 homopolymer.

The antioxidant employed herein is a sterically hindered phenolic antioxidant. Such antioxidants are disclosed in U.S. Pat. Nos. 3,285,855 and 3,644,482 which disclosures are herein incorporated by reference. Preferred antioxidants are Hostanox ® 03, available from American Hoechst Corp. and Cyanox ® 1790, available from American Cyanamid Corp.

Hostanox ® 03 is bis-[3,3-bis(4'hydroxy-3'tert.butylphenyl)-butanoic acid]-glycolester and has the structure:

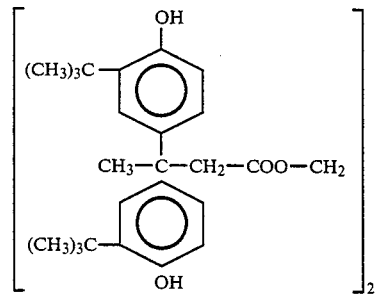

Cyanox ® 1790 is 1,3,5-Tris(4-tert-butyl-3-hydroxy-2,6-dimethylbenzyl)-1,3,5-triazine-2,4,6-(1H,3H,5H)-trione.

Lauryl-stearyl thiodipropionate has the structure

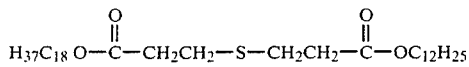

Another necessary component of the present invention is a nucleating agent. Nucleating agents contemplated in this invention include by way of example:
high density polyethylene;
graphitic non-turbostratic carbon;
fatty acid amides;
anthraquinones;
and amides.

Other nucleating agents are also contemplated for use in this invention. Graphitic non-turbostatic carbon nucleating agents are disclosed in copending application Ser. No. 183,869 filed Sept. 4, 1981, now U.S. Pat. No. 4,321,334 (having common assignee). Fatty acid amide nucleating agents are disclosed in copending application Ser. No. 216,055 filed Dec. 15, 1980, now U.S. Pat. No. 4,322,503 (having common assignee). These fatty acid amides include specifically N,N'-ethylene-bis-stearamide and stearamide. Anthraquinone nucleating agents are disclosed in copending patent application Ser. No. 218,865 filed Dec. 22, 1980, now abandoned (having common assignee). Specific anthraquinones include 1,2-dihydroxy-9,10-anthraquinone; 1,4-dihydroxy-9,10-anthraquinone; 1,5-dihydroxy-9,10-anthraquinone; 12,5,8-tetrahydroxy-9,10-anthraquinone; 9,10-anthraquinone; and sodium 2-anthraquinone sulfonate. Amide nucleating agents are disclosed in copending application Ser. No. 214,148 filed Dec. 8, 1980, now U.S. Pat. No. 4,320,209 (having common assignee). Preferred amides include 1-naphthalene acetamide; N-stearoyl-p-aminophenol; mercapto-N-2-naphthylacetamide; malonamide; nicotinamide; isonicotinamide; benzamide; phthalimide; salicylamide; anthranilamide; and 1,8-naphthalimide.

A much preferred nucleating agent is high density polyethylene. The high density polyethylene employed in the composition of this invention is characterized by a density above about 0.93 g/cc and preferably at least about 0.95 g/cc. An HDPE with a melt index of from about 0.1 to 20, as measured by ASTM D1238, Condition E, is typically employed; HDPE of higher melt index may also be suitable. The melt index and molecular weight of HDPE are inversely related; the corresponding molecular weight for a polymer with a given melt index may be readily determined by routine experimentation. A particularly suitable HDPE, for example has a melt index of 0.45 g/10 min., a weight average molecular weight of about 166,000 and a density of 0.950 grams/cm$^3$. A high density polyethylene with a viscosity at mixing temperatures approximating that of the butene-1-homopolymer facilities intimate mixing in conventional extrusion compounding equipment. A wide variety of suitable high density polyethylenes are commercially available and methods for their preparation are well known in the art. They may be prepared by polymerization processes employing Ziegler type coordination catalysts or supported chromium oxide catalysts. Commercially available HDPE of either type is suitable. "HDPE" refers to high density polyethylene of the type described. As shown in the examples, the HDPE significantly increases the pipe extrusion speed. Also, as shown in the Illustrative Embodiments, the HDPE unexpectedly increases the elongation (MD) of the composition.

The filler component employed in this invention is a coated mineral filler, in particular a magnesium silicate coated with an acid acceptor. The preferred magnesium silicate is talc which is described in Kirk-Othmer, "Encyclopedia of Chemical Technology", Second Edition, Volume 19, pages 608 et seq. The acid acceptors which are coated on the mineral filler are preferably stearates of weak bases, such as alkaline earth metal stearates. A preferred acid acceptor is zinc stearate. Accordingly, the preferred filler component is zinc stearate-coated talc. Such materials are well known, commercially available fillers.

In addition to adding certain strength properties to the composition of the invention, the particular fillers employed herein also unexpectedly improve the long term stability of the blends.

Pigments are added as desired to achieve a particular color for the resin. Typical pigments include carbon blacks, titanium dioxide, and iron oxide.

The relative amounts of each of the various ingredients in the polymeric composition of the present invention, are listed below in percent by weight (the total for a particular composition adding up, of course, to 100 percent):

|  | Preferred | More Preferred |
| --- | --- | --- |
| Butene-1 homopolymer | 93 to 98 | 95 to 97 |
| Antioxidant | 0.05 to 0.5 | 0.1 to 0.3 |
| Costabilizer | 0.2 to 0.7 | 0.3 to 0.5 |
| Nucleating Agent | 0.02 to 0.6 | 0.025 to 0.5 |
| Filler | 0.5 to 3.0 | 1.0 to 2.0 |
| Pigment | 0 to 3.0 | 1.0 to 2.0 |

The relative amounts of these various ingredients are important in achieving the overall balance of superior properties. For example, it has been shown that if too much stabilizer is added some of the stabilizer will bloom to the surface. If desired, various other ingredients such as conventional fillers, thermal and ultraviolet stabilizers, processing agents, tracer compounds and/or other additives may be incorporated into the polymer composition so long as their addition does not significantly effect the properties of the present composition. In this event, it is understood that these other materials are excluded when calculating the added concentration of the various ingredients of this invention.

In a preferred embodiment, the various ingredients are blended or intimately mixed in an intensive mixing device such as a twin-screw extruder or Banbury mixer. The resulting blends have particular utility as extruded pipe for hot water service in view of the long-term stability of such resins in hot water.

The invention is further illustrated by reference to the following Illustrative Embodiments, which are given for the purpose of illustration only and are not meant to limit the invention to the particular reactants and conditions employed therein.

ILLUSTRATIVE EMBODIMENT I

In Illustrative Embodiment I, twelve different formulations were examined. The various ingredients employed in the five formulations were:

| Ingredient | Trade Name | Description |
|---|---|---|
| butene-1 homopolymer | Shell polybutylene | Pipe grade, butene-1 homopolymer with melt index of 0.4 dg/min and number average molecular weight of 73,000 |
| hindered phenolic antioxidant | HOSTANOX ® 03 | See earlier description |
| hindered phenolic antioxidant | IRGANOX ® 1010 | (3',5'-di-tert-butyl-4'-hydroxyphenyl) propionate methane or tetrakis (methylene (3.5-di-tert-butyl-4-hydroxyhydrocinnamate) methane |
| hindered phenolic antioxidant | CYANOX ® 1790 | 1,3,5-Tris(4-tert-butyl-3-hydroxy-2,6-dimethylbenzyl)-1,3,5-triazine-2,4,6-(1H,3H,5H)-trione |
| hindered phenolic antioxidant | NAUGARD ® XL-1 | 2,2'-oxamidobis-[ethyl 3-(3.5-di-tert-butyl-4-hydroxyphenyl) propionate] |
| Costabilizer | CYANOX ® 1212 | lauryl-stearyl thiodipropionate |
| Costabilizer | SEENOX ®412S | Pentaerythritol tetrakis ($\beta$-lauryl thiopropionate) |
| Costabilizer | HOSTANOX SE-10 | Dioctadecyl disulphide |
| HDPE | DuPont 7815 | High density polyethylene |
| Filler Component | Mistron ZSC | Zinc stearate-coated talc |

Other ingredients employed in the formulations were standard carbon blacks, $TiO_2$ and tracer compounds.

The various ingredients were prepared by first masterbatching the ingredients in a Banbury mixer. Then the masterbatch was let down with the remaining butene homopolymer in an extruder at about 200° C. The seven formulations are presented below in Table 1 (relative amounts are expressed in weight percent):

TABLE I

| Ingredient | \multicolumn{12}{c}{Formulation No.} | | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Cyanox 1790 | 0.2 | — | — | — | 0.2 | — | — | — | 0.2 | — | — | — |
| Hostanox 03 | — | 0.2 | — | — | — | 0.2 | — | — | — | 0.2 | — | — |
| Irganox 1010 | — | — | 0.2 | — | — | — | 0.2 | — | — | — | 0.2 | — |
| Naugard XL-1 | — | — | — | 0.2 | — | — | — | 0.2 | — | — | — | 0.2 |
| Cyanox 1212 | 0.4 | 0.4 | 0.4 | 0.4 | — | — | — | — | — | — | — | — |
| Seenox 412S | — | — | — | — | 0.4 | 0.4 | 0.4 | 0.4 | — | — | — | — |
| Hostanox SE-10 | — | — | — | — | — | — | — | — | 0.4 | 0.4 | 0.4 | 0.4 |
| Talc[a] | 1.2 | 1.2 | 1.2 | 1.2 | 1.2 | 1.2 | 1.2 | 1.2 | 1.2 | 1.2 | 1.2 | 1.2 |
| $TiO_2$ | 1.7 | 1.7 | 1.7 | 1.7 | 1.7 | 1.7 | 1.7 | 1.7 | 1.7 | 1.7 | 1.7 | 1.7 |
| Carbon Black | 0.06 | 0.06 | 0.06 | 0.06 | 0.06 | 0.06 | 0.06 | 0.06 | 0.06 | 0.06 | 0.06 | 0.06 |
| ZnO | 0.012 | 0.012 | 0.012 | 0.012 | 0.012 | 0.012 | 0.012 | 0.012 | 0.012 | 0.012 | 0.012 | 0.012 |
| HDPE[b] | 0.1 | 0.1 | 0.1 | 0.1 | 0.1 | 0.1 | 0.1 | 0.1 | 0.1 | 0.1 | 0.1 | 0.1 |
| PB (BR 200) | Bal. | Bal. | Bal. | Bal. | Bal. | Bal. | Bal. | Bal. | Bal. | Bal. | Bal. | Bal. |

[a]Zn-stearate-coated.
[b]Alathon 7815 (DuPont).

Each of the four hindered phenolic antioxidants (Cyanox 1790, Hostanox 03, Irganox 1010 and Naugard XL-1) was used in combination with one of the three co-stabilizers (Cyanox 1212, Seenox 412S and Hostanox SE-10). The same gray pigment system was used in all the twelve formulations. The resins were compounded in a Brabender mixing head at 175° C. at 60 RPM for five minutes under nitrogen purge in order to avoid oxidative degradation. Each resin was then compression-molded into 60 mil thick plaque. After transformation in at least 7 days to the stable hexagonal crystal form I of PB, the plaques were immersed in a 95° C. water bath to evaluate long term stability in hot water. Periodically samples were withdrawn and hot air oven stability at 150° C. was determined. The time to reach chracteristic tackiness and color change (to yellow-brownish) was taken as the failure point in the oven. The exudation or blooming of stabilizers to the plaque surface was also monitored as a function of storage time in ambient air (23° C.).

Table II shows the oven life after hot water aging as a measure of long term stability for the twelve formulations. Among these formulations 127-4 through 127-8 and 12 showed lower stability than the other seven resins. In later experiments, resins 127-3 and 127-10 showed stabilizer blooming to the plaque surface after 24 days (from compression molding) at ambient temperature and pressure. Due to observation of the blooming tendency of Hostanox SE-10 in gray and black PB formulations, and because Cyanox 1212 is potentially more acceptable than Hostanox SE-10 in a PB resin for potable water pipe, resins 127-9 through 127-12 were not chosen for further development. After considering all the relevant factors, formulations 127-1 and 127-2 showed the best combination of properties. Plaques of 127-1 and 127-2 have not bloomed in air up to four months.

TABLE II

Effect of Hot Water Aging of 60-mil Plaques on the Oven Stability for Twelve Experimental PB Resin Formulations shown in Table I

| Days in 95° C. Water | Oven Life (days) at 150° C. for Formulation No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 59 | 61 | 57 | 62 | 88 | 98 | 75 | 73 | 51 | 57 | 40 | 38 |
| 10 | 58 | 60 | 46 | 58 | 100 | 100 | 55 | 71 | 46 | 46 | 46 | 37 |
| 27 | 60 | 57 | 37 | 54 | 101 | 104 | 41 | 62 | 54 | 54 | 41 | 32 |
| 50 | 64 | 63 | 42 | 55 | 105 | 95 | 34 | 64 | 53 | 53 | 39 | 31 |
| 120 | 46 | 50 | 34 | 34 | 90 | 65 | 28 | 51 | 39 | 35 | 25 | 23 |
| 245 | 33 | 40 | 22 | 10 | 14 | 5 | 3 | 15 | 38 | 40 | 19 | 5 |
| 367 | 23 | 34 | 17 | 7 | 2 | 2 | 2 | 2 | — | 30 | 17 | 2 |
| 497 | — | — | — | 5 | 0.5 | 0.5 | 0.5 | 0.5 | 22 | — | — | 10 |
| 512 | 9 | 22 | 11 | — | — | — | — | — | — | 23 | 13 | — |

What is claimed is:

1. District heating pipes for potable water which contain a polymeric composition consisting essentially of an intimate blend of:
   (a) about 93 to about 98 percent by weight of an isotactic butene-1 homopolymer;
   (b) about 0.05 to about 0.5 percent by weight of 1,3,5-Tris(4-tert-butyl-3-hydroxy-2,6-dimethyl-benzyl)-1,3,5-triazine-2,4,6-(1H,3H,5H)-trione antioxidant;
   (c) about 0.2 to about 0.7 percent by weight of lauryl-stearyl thiodipropionate;
   (d) about 0.02 to about 0.6 percent by weight of a nucleating agent;
   (e) about 0.5 to about 3.0 percent by weight of filler component comprising a mineral filler coated with an acid acceptor; and
   (f) zero to about 3.0 percent by weight pigment.

2. The pipes according to claim 1 wherein said filler component comprises a magnesium silicate coated with a metal stearate.

3. The pipes according to claim 1 wherein said filler component is zinc stearate coated talc.

4. The pipes of claim 1 wherein the relative amounts of each component are:
   (a) about 95 to about 97 percent by weight butene-1 homopolymer;
   (b) about 0.1 to about 0.3 percent by weight antioxidant;
   (c) about 0.3 to about 0.5 percent by weight lauryl-stearyl thiodipropionate;
   (d) about 0.025 to about 0.5 percent by weight nucleating agent;
   (e) about 1.0 to about 3.0 percent by weight filler; and
   (f) about 1.0 to about 2.0 percent by weight pigment.

5. The pipes of claim 1 wherein said nucleating agent is high density polyethylene.

6. The pipes of claim 1 wherein said pigment is selected from the group consisting of titanium dioxide and carbon black.

* * * * *